No. 654,310. Patented July 24, 1900.
R. HUNDHAUSEN.
JUNCTION OR CONNECTION BOX.
(Application filed Nov. 18, 1899.)

(No Model.) 2 Sheets—Sheet 1.

Witnesses:
Max Zabel
C. E. Nubert

Inventor:
Rudolf Hundhausen,
By Charles A. Brown + Cragg
Attorneys.

No. 654,310. Patented July 24, 1900.
R. HUNDHAUSEN.
JUNCTION OR CONNECTION BOX.
(Application filed Nov. 18, 1899.)
(No Model.) 2 Sheets—Sheet 2.
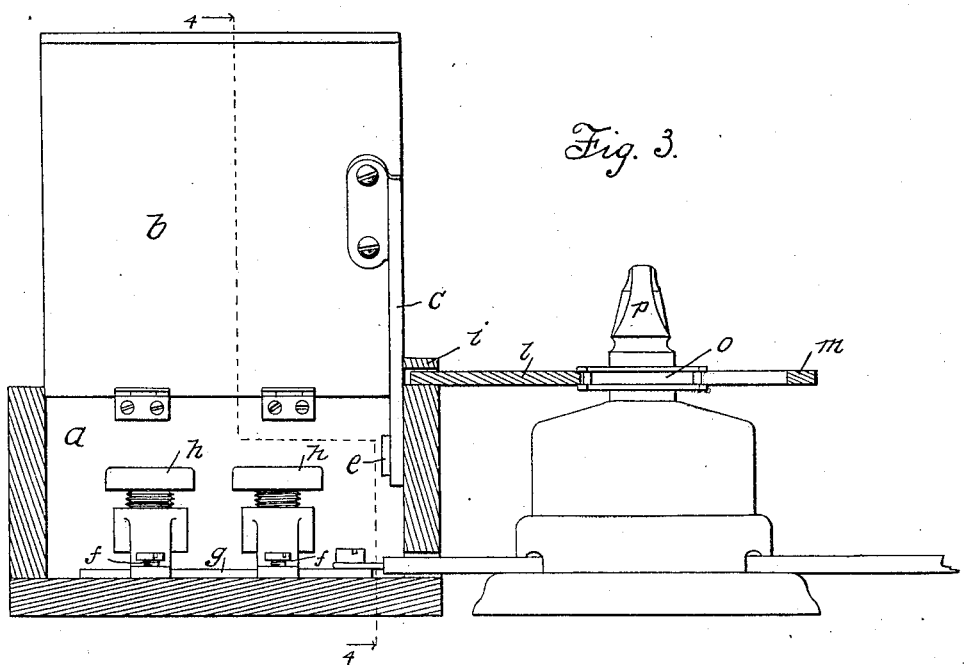
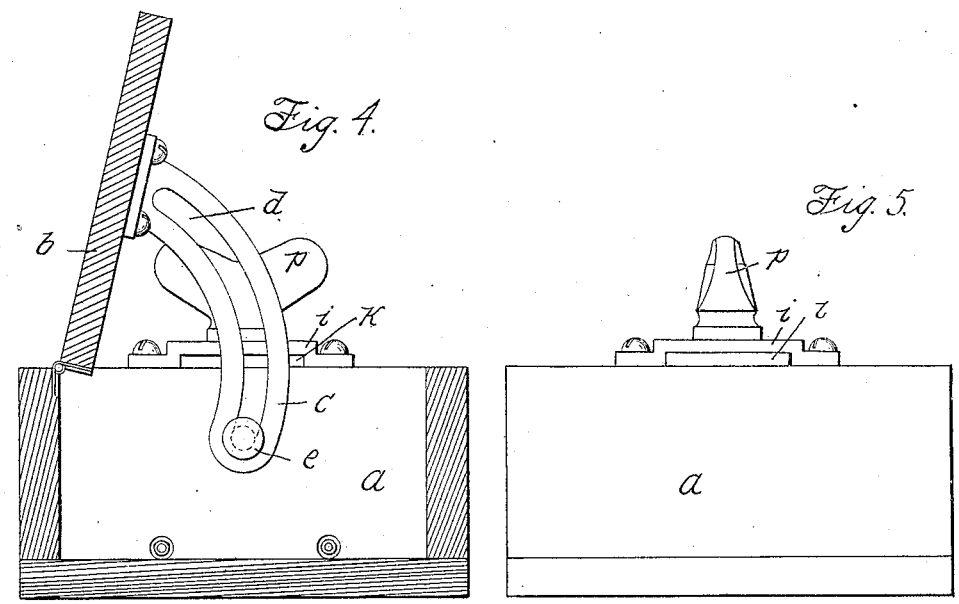
Witnesses:
Max Zahl.
C. J. Schmidt.
Inventor:
Rudolf Hundhausen,
By Charles A. Brown & Co.
Attorneys.

UNITED STATES PATENT OFFICE.

RUDOLF HUNDHAUSEN, OF WILMERSDORF, GERMANY, ASSIGNOR TO THE SIEMENS & HALSKE ELECTRIC COMPANY OF AMERICA, OF CHICAGO, ILLINOIS.

JUNCTION OR CONNECTION BOX.

SPECIFICATION forming part of Letters Patent No. 654,310, dated July 24, 1900.

Application filed November 18, 1899. Serial No. 737,443. (No model.)

*To all whom it may concern:*

Be it known that I, RUDOLF HUNDHAUSEN, a subject of the Emperor of Germany, residing at Wilmersdorf, near Berlin, Germany, have invented a certain new and useful Improvement in Junction or Connection Boxes, (Case No. 245,) of which the following is a full, clear, concise, and exact description, reference being had to the accompanying drawings, forming a part of this specification.

My invention relates to junction or connection boxes where supply-circuits are to be connected with the mains, and has for its object the provision of improved means whereby when access is to be had to the terminals within the box the connection of the mains with the terminals within the box has to be broken before access to the box can be had.

My invention may generally be described as consisting of a junction or connection box containing the terminals of the supply circuit or circuits, a cover therefor, and a switch controlling the continuity of the mains, coöperating with the said cover in such a manner that before the cover can be opened the switch will have to be operated to open the mains and before the switch can be operated to close the circuit through the mains the cover will have to be closed.

In accordance with the preferred embodiment of my invention I employ a cover which is mounted to swing upon hinges, a guard-plate movable with the cover for preventing the closing of the switch when the cover is opened, and a second guard-plate coöperating with the switch for preventing the cover from being opened when the switch is closed. In order to open the cover, the guard-plate coöperating with the switch has to be shifted, the cover in being opened bringing the guard moving therewith into the path of the guard coöperating with the switch to prevent the switch from being closed while the cover is opened. The guard coöperating with the switch also serves in the preferred embodiment of the invention directly as a lock.

I will explain my invention more particularly by reference to the accompanying drawings, in which—

Figure 1:
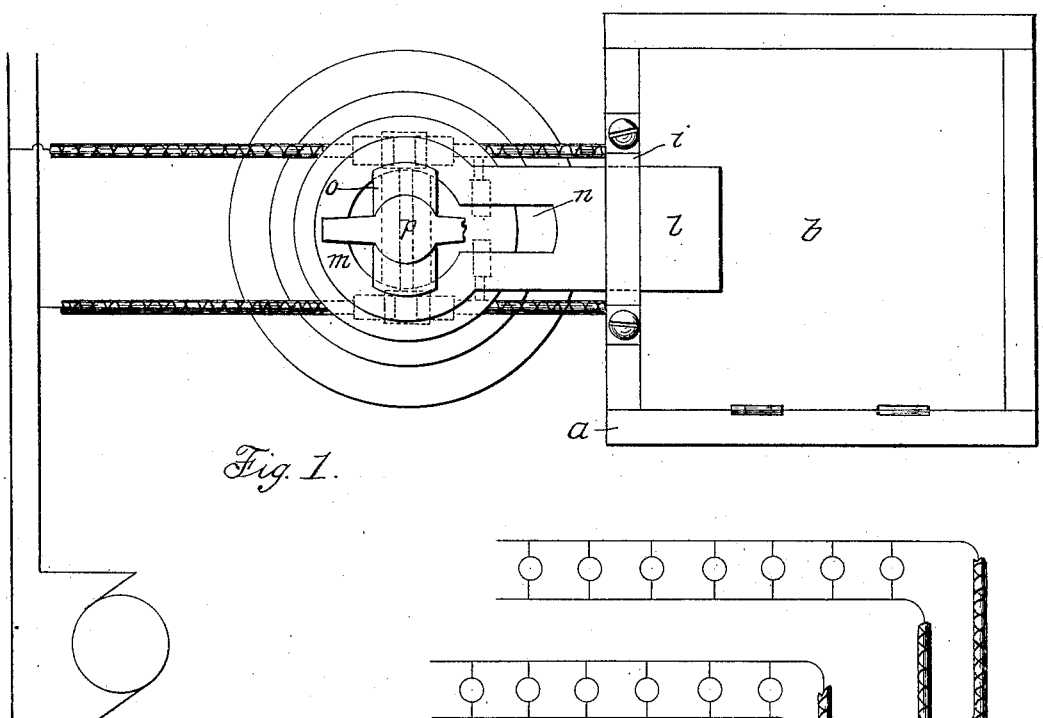
Figure 2:
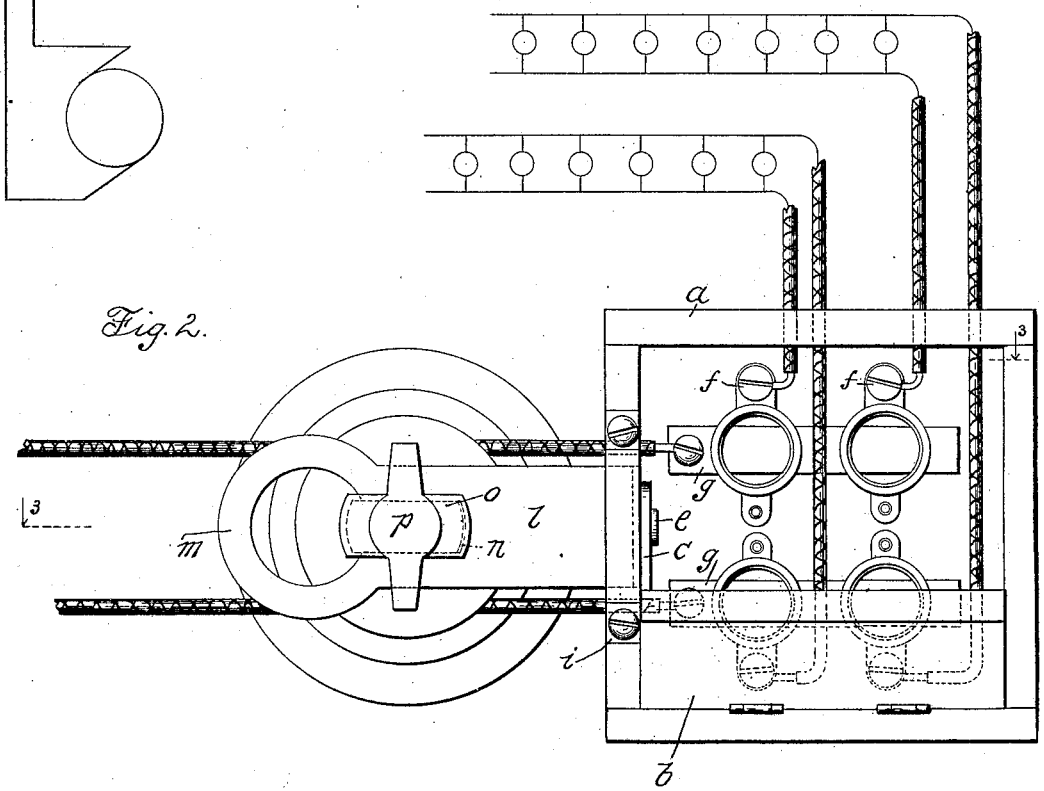

Figure 1 is a plan view of a junction-box and its associated switch, the box being closed and circuit connections being indicated diagrammatically. Fig. 2 is a view similar to Fig. 1, except that the lid is open. Fig. 3 is a sectional view on line 3 3 of Fig. 2. Fig. 4 is a sectional view on line 4 4 of Fig. 3. Fig. 5 is a side elevation of the box closed.

Like letters indicate like parts throughout the different figures.

The particular form of box $a$ shown is rectangular and is provided with a lid $b$, hinged at one edge and when closed having its top surface flush with the top edges of the sides of the box. This cover is provided with a segmental arm $c$, having a slot $d$ therein which engages a pin $e$ upon the interior of the box. Within the box are shown a number of terminals $f\,f$ of supply-conductors, which are adapted for connection with main terminals $g\,g$ through the agency of fuse-plugs $h\,h$, as indicated most clearly in Fig. 3. A plate $i$ is mounted upon the edge of the box contiguous to the arm $c$, this plate affording a recess $k$, in which a longitudinally-movable guard-plate $l$ may move. This guard is provided with a hinge extension $m$, affording a circular recess, this circular recess having a longitudinal extension $n$, which extension is adapted to receive an oblong block $o$, rigidly secured to a switch-handle $p$. Such an engagement of the slot $n$ with the block $o$ is shown in Figs. 2 and 3.

When the box-lid is closed, the parts occupy the position illustrated in Fig. 1, the narrow ends of the block $o$ being curved to conform to the interior of the hinge extension $m$, whereby the block $o$ may readily be rotated to open and close the circuit through the main conductors. When the parts are in the position illustrated in Figs. 1 and 5, the guard $l$ is locked above the cover of the box and prevents the same from being opened. In order to open the box, it is necessary to swing the handle $p$ to the position indicated in Fig. 2 to bring the block $o$ in proper alinement with the slot $n$, whereupon the guard $l$ may be withdrawn from its position above the cover to permit the same to be opened. The cover in being opened brings the guard $c$ before the guard $l$, the guard $c$ thereby preventing the guard *l* from being moved toward the box. The guard *l* thus being immovable when the lid is open, the switch *p* is incapable of operation to close the circuit through the main conductors, as the block *o* by its engagement with the slot *n* prevents the switch from being rotated. I am thus enabled to provide an improved form of junction-box to which it is impossible to gain access while the circuit through the main conductors leading thereto is closed and wherein it is impossible to close the circuit through the main conductors while the box is open.

Departures may be made readily from the precise embodiment of the invention herein shown and particularly described, and I therefore do not wish to be limited to the precise details of the invention shown and described; but,

Having thus described my invention, I claim as new and desire to secure by Letters Patent—

1. The combination with a box containing supply-terminals and having a cover, of a switch for controlling the continuity of the main conductors, and interlocking means interposed between the switch and cover, controlled by the switch and adapted by coöperation with the switch to prevent the cover from being opened when the switch is closed, substantially as described.

2. The combination with a box containing circuit connections and having a cover, of a circuit-closing switch for controlling the supply of current to connections in the box, and interlocking means interposed between the switch and cover, controlled by the switch and adapted by coöperation with the switch to prevent the cover from being opened when the switch is closed, substantially as described.

3. The combination with a box containing circuit connections and having a cover, of a circuit-closing switch for controlling the supply of current to connections in the box, interlocking means interposed between the switch and cover, jointly controlled by the switch and cover and adapted through the agency of the switch when closed to prevent the box from being opened, and through the agency of the cover when opened to prevent the switch from being closed, and means associated with the switch and interlocking means compelling the opening of the switch before the interlocking means can be operated to permit the opening of the cover, substantially as described.

4. The combination with a box *a* for containing circuit connections, of a swinging lid *b* therefor, a guard *c* carried by the lid, a switch for controlling the supply of current to the circuit connections within the box, a guard *l* associated therewith, said guard *l* being provided with a ring extension *m*, an elongated block, and a slot or recess *n* extending longitudinally of the guard *l* and communicating with the space inclosed by the ring *m*, substantially as described.

5. The combination with an inclosure provided with a cover, of a circuit-controlling switch and means coöperating with the switch and cover to prevent the latter from being opened with the switch in one position and permitting the cover to be opened with the switch in another position, substantially as described.

6. The combination with an inclosure provided with a cover, of a circuit-controlling switch and means coöperating with the switch and cover to prevent the switch from being closed with the cover in one position and permitting the switch to be closed with the cover in another position, substantially as described.

7. The combination with an inclosure provided with a cover, of a circuit-controlling switch and means coöperating with the switch and cover, to prevent the latter from being opened with the switch in one position, and to prevent the switch from being closed with the cover in an open position, substantially as described.

8. The combination with an inclosure containing circuit connections and provided with a swinging cover, of a guard carried by the cover, a switch for controlling the supply of current to the circuit connections within the inclosure, and a guard *l* coacting in one position with the aforesaid guard when the cover is opened to prevent the switch from closing circuit to said connections, and serving in another position to prevent the cover from being opened and permitting the switch to close said circuit, substantially as described.

9. The combination with an inclosure containing circuit connections and provided with a cover, of a guard carried by the cover, a switch for controlling the supply of current to the circuit connections within the inclosure, and a guard *l* coacting in one position with the aforesaid guard when the cover is opened to prevent the switch from closing circuit to said connections, and serving in another position to prevent the cover from being opened and permitting the switch to close said circuit, substantially as described.

In witness whereof I hereunto subscribe my name this 10th day of October, A. D. 1899.

RUDOLF HUNDHAUSEN.

Witnesses:
  WOLDEMAR HAUPT,
  HENRY HASPER.